United States Patent
Gunji et al.

(10) Patent No.: US 10,749,176 B2
(45) Date of Patent: Aug. 18, 2020

(54) CATHODE ACTIVE MATERIAL USED FOR LITHIUM ION SECONDARY BATTERY, METHOD FOR PRODUCING SAME, AND LITHIUM ION SECONDARY BATTERY

(71) Applicant: HITACHI METALS, LTD., Tokyo (JP)

(72) Inventors: Akira Gunji, Tokyo (JP); Xiaoliang Feng, Tokyo (JP); Hisato Tokoro, Tokyo (JP); Takashi Nakabayashi, Tokyo (JP); Shuichi Takano, Tokyo (JP); Tatsuya Tooyama, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 118 days.

(21) Appl. No.: 16/063,566

(22) PCT Filed: Dec. 28, 2016

(86) PCT No.: PCT/JP2016/089174
§ 371 (c)(1),
(2) Date: Jun. 18, 2018

(87) PCT Pub. No.: WO2017/126312
PCT Pub. Date: Jul. 27, 2017

(65) Prior Publication Data
US 2019/0006670 A1    Jan. 3, 2019

(30) Foreign Application Priority Data
Jan. 19, 2016 (JP) .................................. 2016-008215

(51) Int. Cl.
*H01M 4/36* (2006.01)
*H01M 4/525* (2010.01)
(Continued)

(52) U.S. Cl.
CPC ............ *H01M 4/525* (2013.01); *C01G 53/00* (2013.01); *C01G 53/50* (2013.01); *H01M 2/04* (2013.01);
(Continued)

(58) Field of Classification Search
None
See application file for complete search history.

(56) References Cited

U.S. PATENT DOCUMENTS

2010/0209771 A1    8/2010   Shizuka et al.
2013/0011726 A1    1/2013   Takano et al.
(Continued)

FOREIGN PATENT DOCUMENTS

JP    2005-025975 A    1/2005
JP    2009-289726 A    10/2009
(Continued)

OTHER PUBLICATIONS

Japanese Office Action dated Nov. 19, 2019 for the Japanese Patent Application No. 2017-562492.
(Continued)

*Primary Examiner* — Wyatt P McConnell
(74) *Attorney, Agent, or Firm* — Volpe and Koenig, P.C.

(57) ABSTRACT

Provided are a cathode active material used for a lithium ion secondary battery having a high discharge capacity, and a small increase in internal resistance caused following charge/discharge cycles; a method for producing the same; and a lithium ion secondary battery. The cathode active material has a layered structure assigned to a space group of R-3m represented by the formula: $Li_{1+a}M1O_{2+\alpha}$ (where M1 represents metal elements other than Li containing at least Ni, $-0.05 \leq a \leq 0.15$, $-0.1 \leq \alpha \leq 0.1$). A content of Ni is 70 atom % or more, and a generating amount of oxygen gas in the range from 200° C. to 450° C. is 30 mass ppm or less. The (Continued)

method comprises the steps of grinding and mixing a lithium raw material, and firing the resultant mixture in the range of 650° C. or more and 900° C. or less.

8 Claims, 3 Drawing Sheets

(51) Int. Cl.

| | | |
|---|---|---|
| *H01M 4/505* | (2010.01) | |
| *C01G 53/00* | (2006.01) | |
| *H01M 2/04* | (2006.01) | |
| *H01M 2/16* | (2006.01) | |
| *H01M 4/04* | (2006.01) | |
| *H01M 4/583* | (2010.01) | |
| *H01M 4/62* | (2006.01) | |
| *H01M 4/587* | (2010.01) | |
| *H01M 10/0525* | (2010.01) | |
| *H01M 4/02* | (2006.01) | |

(52) U.S. Cl.
CPC ............... *H01M 2/16* (2013.01); *H01M 4/04* (2013.01); *H01M 4/366* (2013.01); *H01M 4/505* (2013.01); *H01M 4/583* (2013.01); *H01M 4/623* (2013.01); *C01P 2002/72* (2013.01); *C01P 2002/76* (2013.01); *C01P 2002/88* (2013.01); *C01P 2004/50* (2013.01); *C01P 2004/61* (2013.01); *C01P 2004/62* (2013.01); *H01M 4/587* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2014/0339466 A1 | 11/2014 | Okamoto |
| 2017/0155139 A1* | 6/2017 | Feng ............... H01M 4/505 |
| 2017/0187031 A1 | 6/2017 | Kurita et al. |

FOREIGN PATENT DOCUMENTS

| | | | |
|---|---|---|---|
| JP | 2012-23015 A | 2/2012 | |
| JP | 2014-060126 A | 4/2014 | |
| WO | 2015/037111 A1 | 3/2015 | |
| WO | 2015/182665 A1 | 12/2015 | |
| WO | 2016/006557 A1 | 1/2016 | |

OTHER PUBLICATIONS

International Search Report for WO 2017/126312 A1, dated Apr. 11, 2017.

* cited by examiner

CATHODE ACTIVE MATERIAL USED FOR LITHIUM ION SECONDARY BATTERY, METHOD FOR PRODUCING SAME, AND LITHIUM ION SECONDARY BATTERY

FIELD OF INVENTION

The present invention relates to a cathode active material used for a lithium ion secondary battery, a method for producing the cathode active material, and a lithium ion secondary battery.

BACKGROUND ART

Recently, many expectations are raised on an electric vehicle consuming less energy for traveling, and a power generation system using natural energy such as solar light and wind power due to prevention of global warming and concerns of exhaustion of fossil fuels. However, those technologies have the following technical disadvantages, which prevent their wide use.

Disadvantages of an electric vehicle are a low energy density of a driving battery and a short traveling distance per one time charge. On the contrary, disadvantages of a power generation system using natural energy are large fluctuation of a power generating amount, and necessity of a large capacity battery for output leveling, which results in high costs. Any of those technologies demand a secondary battery produced at a low cost and having a high energy density.

Here, a lithium ion secondary battery is expected to be applied to an electric vehicle and a power storage system because an energy density per weight thereof is higher than other secondary batteries like a nickel-hydrogen battery and a lead battery. However, a further highly improved energy density is required for responding to the demand of an electric vehicle and a power storage system. Such a further highly improved energy density requires an enhancement of energy densities of a cathode and an anode.

A layered compound having a layered structure assigned to a space group of R-3m and represented by the formula: $LiM1O_2$ (where M1 represents metal elements other than Li) is widely used as a cathode active material that constructs a cathode of a lithium secondary battery. Metal elements other than Li generally include Co, Ni and their combination with Mn. Among them, a layered compound containing nickel (Ni) as a main component is known as a cathode material showing a high energy density. In particular, a layered compound having a high content of nickel over 70 atom % per metal elements (M1) may realize a reversible capacity over 180 Ah/kg.

Conventionally, proposed is a technology for improving battery properties of a lithium ion secondary battery having a cathode material made of a layered compound containing such a high content of nickel as a main component. For example, Patent Document 1 discloses a cathode active material used for a lithium ion secondary battery of which composition formula is represented by $Li_xNi_{1-y}M_yO_{2+\alpha}$ (where $0.9 \leq x \leq 1.2$, $0 < y \leq 0.7$, $-0.1 \leq \alpha \leq 0.1$, and M is a metal).

Further, disclosed is that in such a cathode active material, a generating rate at a peak of $H_2O$ has a maximum value of 5 mass ppm/sec or less in the range from 200° C. to 400° C., and a generating rate at a peak of $CO_2$ has a maximum value of 3 mass ppm/sec or less in the range from 150° C. to 400° C., when the cathode active material (e.g., 5 mg to 30 mg) is measured by the TPD-Ms.

DOCUMENTS OF PRIOR ART

Patent Documents

Patent Document 1: Japanese Unexamined Patent Application Publication No. 2014-060126)

SUMMARY OF INVENTION

Problems to be Solved by Invention

Here, Patent Document 1 teaches that a high initial discharge capacity and charge/discharge efficiency (i.e., initial coulomb efficiency) are achieved by controlling a maximum value of a generating rate at a peak of $H_2O$ and/or at a peak of $CO_2$ in the range of predetermined temperatures thus observed by TPD-MS measurement to a certain value or less (see Examples of Patent Document 1).

Herein, it is described that a maximum value of a generating rate at a peak of $H_2O$ is controlled by reducing generation of fine powders during production steps, or managing a dew point. Further, it is described that a maximum value of a generating rate at a peak of $CO_2$ is controlled by reducing an amount of residual alkali.

Despite of the above teachings, a nickel-containing layered compound is strongly demanded to be improved for not only initial properties like an initial discharge capacity, etc. but also charge/discharge cycle properties. A layered compound having a high content of nickel especially shows a high discharge capacity, while there is a disadvantage that a charge/discharge cycle property thereof is insufficient.

More specifically, the higher a nickel content is made for the purpose of increasing a theoretical capacity, the more a defect of a crystal structure occurs because a reaction from $Ni^{2+}$ to $Ni^{3+}$ is suppressed due to instability of nickel which is stable in a bivalent state.

As a result, internal resistance is remarkably increased associated with charge/discharge cycles. However, it is difficult to suppress deterioration of the above properties only by controlling amounts of water and residual alkali.

In view of the above, an object of the present invention is to provide a cathode active material used for a lithium ion secondary battery having a high discharge capacity and a small increase in internal resistance caused following charge/discharge cycles, a method for producing the cathode active material, and a lithium ion secondary battery.

Means for Solving Problems

For solving the above disadvantages, a cathode active material used for a lithium ion secondary battery of the present invention has a layered structure assigned to a space group of R-3m and represented by the following formula: $Li_{1+a}M1O_{2+\alpha}$ (where M1 represents metal elements other than Li and contains at least Ni, $-0.05 \leq a \leq 0.15$, $-0.1 \leq \alpha \leq 0.1$). A content of Ni is 70 atom % or more per M1. A generating amount of oxygen gas in the range from 200° C. to 450° C. is 30 mass ppm or less when measured by the temperature programmed desorption-mass spectrometry (TPD-MS).

Further, a method for producing a cathode active material used for a lithium ion secondary battery of the present invention includes the step of grinding and mixing a lithium raw material that includes a lithium compound containing lithium as a component in which lithium carbonate has a content of 80 mass % or more, and a metal raw material that includes a nickel compound containing nickel as a component. The resulting raw materials are ground and mixed to have an average particle diameter of 0.3 μm or less. The method further includes the step of firing a powder thus obtained in the grinding and mixing step in the temperature range of 650° C. or more and 900° C. or less.

Moreover, a lithium ion secondary battery of the present invention is provided with a cathode including the cathode active material used for a lithium ion secondary battery.

Effect of Invention

According to the present invention, provided are a cathode active material used for a lithium ion secondary battery, which has a high discharge capacity and a small increase in internal resistance caused following charge/discharge cycles, a method for producing the cathode active material, and a lithium ion secondary battery.

EMBODIMENTS FOR CARRYING OUT INVENTION

Figure 1:
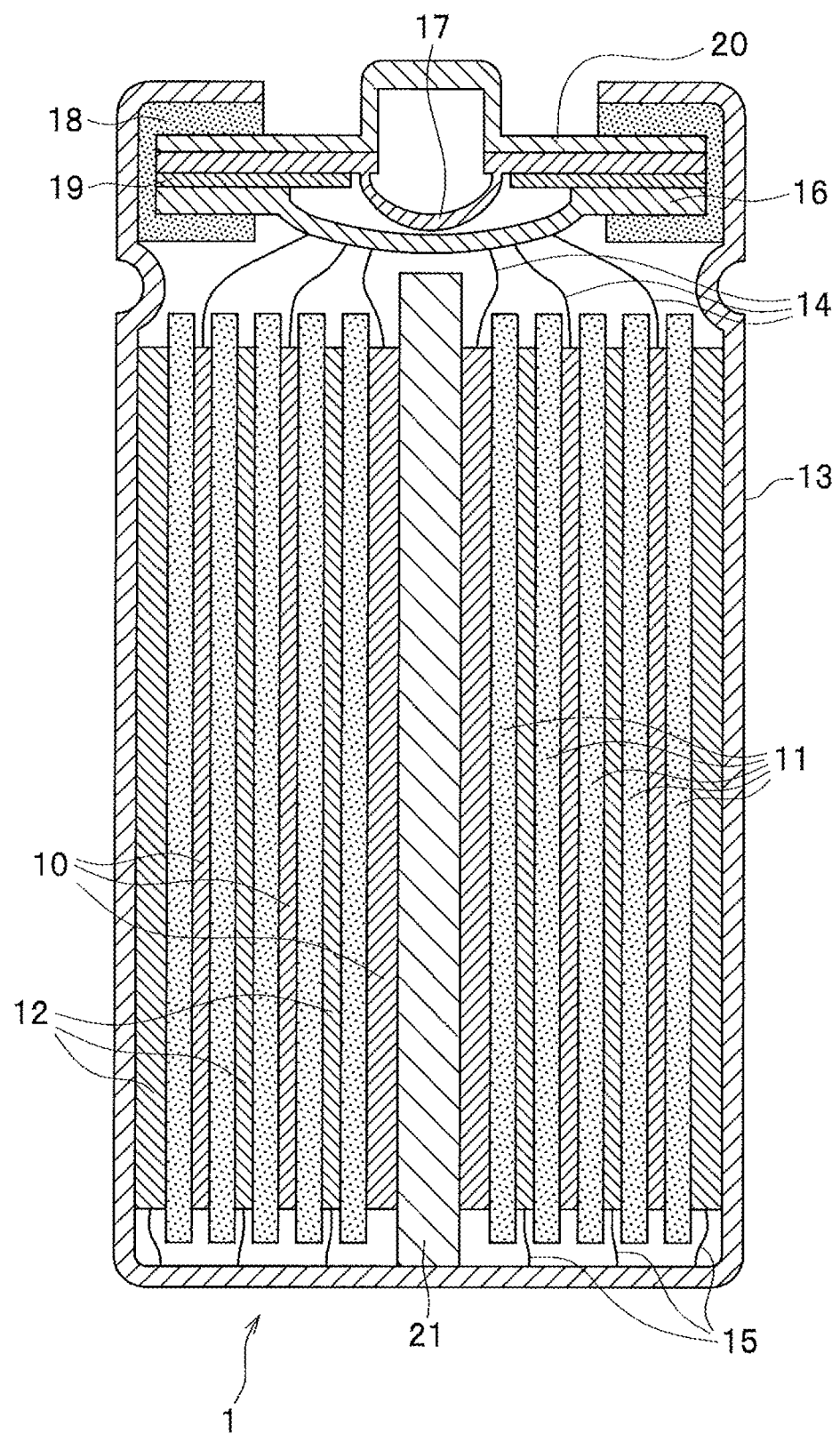
FIG. 1 is a cross-sectional diagram schematically showing a structure of a lithium ion secondary battery in an embodiment of the present invention.

Hereinafter, a cathode active material used for a lithium ion secondary battery in an embodiment of the present invention (hereinafter, a simply referring to as a cathode active material), a method for producing the cathode active material, and a lithium ion secondary battery will be described in detail. Note, the descriptions below show examples of the content of the present invention, and the present invention is not limited to those examples. The present invention may be variously modified by a skilled person in the art without departing from the scope of the technical ideas as disclosed in the present specification.

<Cathode Active Material>

A cathode active material according to the present embodiment is composed including lithium and transition metals. The cathode active material is a composite compound (i.e., layered compound) having a layered structure assigned to a space group of R-3m. The cathode active material is capable of reversely intercalating/de-intercalating lithium ions by applying a voltage thereto, and suitably used as a cathode material of a lithium ion secondary battery.

In detail, a cathode active material of the present embodiment is represented by the following composition formula:

$$Li_{1+\alpha}M1O_{2+\alpha}$$

(where M1 represents metal elements other than Li and contains at least Ni, $-0.05 \leq a \leq 0.15$, $-0.1 \leq \alpha \leq 0.1$).

A cathode active material of the present embodiment has characteristics that a content of nickel (Ni) per metal elements (M1) other than lithium (Li) is 70 atom % or less. The high content of nickel whose valence largely changes can realize a high energy density and a high discharge capacity. Note, a content of nickel (Ni) per metal elements (M1) other than lithium (Li) may have an appropriate value in the range of 70 atom % or more and 100 atom % or less.

The metal elements (M1) other than lithium (Li) include transition metals besides nickel (Ni), non-transition metal elements, or a combination thereof. Examples of those metal elements (M1) include manganese (Mn), cobalt (Co), aluminum (Al), titanium (Ti), zirconium (Zr), molybdenum (Mo), tungsten (W), vanadium (V), niobium (Nb), chromium (Cr), iron (Fe), magnesium (Mg), calcium (Ca), copper (Cu), zinc (Zn), and tin (Sn) or the like. Among them, in view of stabilizing a layered structure, preferably aluminum (Al) or titanium (Ti) is included in M1. However, aluminum (Al) or titanium (Ti) may not be necessarily included in M1.

The cathode active material of the present embodiment has characteristics that a generating amount of oxygen gas ($O_2$) in the temperature range from 200° C. to 450° C. is 30 mass ppm or less when measured by temperature programmed desorption-mass spectrometry (TPD-MS).

Here, TPD-MS is a method for qualitatively analyzing or quantitatively analyzing a component released from a temperature rising sample thus heated under a low pressure or high vacuum. An analytical apparatus of TPD-MS includes a heating device that heats a sample in a closed atmosphere, and a mass spectrometer that analyzes a mass of component released from the sample. Generally, a sample is heated following a predetermined program in a carrier gas of an inert gas like helium (He), etc. and adjusted at around the atmospheric pressure. Then, a component released from the sample associated with the heating is detected by a mass spectrometer, and a concentration change of the composition is calculated as a function of temperature.

A value of the generating amount of oxygen gas can be calculated by heating a temperature of the sample (0.5 g) in a predetermined range of temperatures at a constant rate of 10° C./min, and time-integrating a generating rate [mass ppm/s] of the oxygen gas successively measured during the heating. Herein, the generating rate [mass ppm/s] of the oxygen gas means a ratio of a mass of the oxygen gas generated per unit time against a unit mass of the cathode active material. Note, generating amounts of other components like water thus released can be calculated the same as mentioned above.

The oxygen gas detected in the temperature range from 200° C. to 450° C. when the cathode active material is measured by TPD-MS is mainly derived from oxygen atoms causing crystal structural defects of the cathode active material. Generally, when the layered compound is heated to a high temperature more than around 450° C. to 500° C., the entire part of the layered compound starts thermal decomposition. As a result, many of oxygen atoms present in a crystal of the layered compound are released as a large volume of oxygen gas.

In contrast, the temperature range up to 450° C. targeted in the present embodiment is assumed a temperature range in which the entire part of the cathode active material does not substantially cause thermal decomposition. That is, in this temperature range, mainly oxygen atoms causing crystal structural defects of the cathode active material are released as an oxygen gas, and detected.

As mentioned above, the characteristics that the generating amount of the oxygen gas in the temperature range from 200° C. to 450° C. is small when measured by TPD-MS suggest a small number of crystal structural defects of the cathode active material. Crystal structural defects relative to the release of oxygen atoms may include a local defect having no nickel in a trivalent state and separating from the stoichiometric ratio, and a defect forming no layered structure but generating a heterogeneous phase having other crystal structure.

For example, a layered compound having a high content of nickel tends to form a nickel (II) oxide (NiO)-like cubic crystal following charge/discharge operation. Such a nickel (II) oxide-like cubic crystal is formed by irreversible reduction of nickel that is stable in a bivalent state at the charge/discharge operation, as represented by the following reaction formula (1).

$$LiNiO_2 \rightarrow NiO + \tfrac{1}{2}O_2 + Li^+ + e^- \qquad \text{Reaction Formula (1)}$$

When such a heterogeneous phase is formed in the crystal structure of the layered compound, caused are a decrease in a capacity and an increase in conductive resistance of lithium ions. Many times such a heterogeneous phase is formed starting from a crystal structural defect thus caused following the release of oxygen atoms, or such an heterogeneous phase has a crystal structural defect easily releasing oxygen atoms.

Accordingly, the cathode active material preferably has a small generating amount of oxygen gas in the temperature range from 200° C. to 450° C. when measured by TPD-MS. That is, a layered compound having a small generating amount of oxygen gas when measured by TPD-MS and a small number of crystal structural defects can secure preferable charge/discharge cycle properties.

The cathode active material of the present embodiment has a generating amount of oxygen gas in the temperature range from 200° C. to 450° C. when measured by TPD-MS, preferably at 25 mass ppm or less, more preferably at 20 mass ppm or less. As mentioned above, a smaller generating amount of oxygen gas in the temperature range from 200° C. to 450° C., and a smaller number of crystal structural defects are advantageous for allowing a smaller increase in internal resistance caused following the charge/discharge cycles.

Preferably, the cathode active material of the present embodiment has a generating amount of water ($H_2O$) in the temperature range from 200° C. to 450° C. at 200 mass ppm or less when measured by TPD-MS. Namely, when measured by TPD-MS, preferably a generating amount of water is small, and more preferably the generating amounts of oxygen gas together with water are also small.

Here, water detected in the temperature range from 150° C. to 450° C. when measured by TPD-MS is mainly derived from crystal water or hydrated water of a lithium compound contained in the cathode active material. Such water exists in contact with the cathode active material thereby causing adsorption and deliquescence thereof in the process of producing a lithium ion secondary battery and in use of a lithium ion secondary battery. Alternatively, such water is contained in a form of crystal water in raw materials of the cathode active material, and remains without removed at a production time. Namely, in the above temperature range, crystal water and hydrated water present in crystals of the cathode active material are released and detected, instead of water adsorbed on a surface of the cathode active material.

For example, a layered compound having a high content of nickel tends to easily form a heterogeneous phase like lithium oxide ($Li_2O$) during a production time. Lithium oxide is formed because a reaction between lithium and nickel that is stable in a bivalent state does not rapidly proceed, thereby to generate excess lithium that does not occupy a lithium site. Further, such lithium oxide is also generated when a large amount of lithium is charged.

Here, lithium oxide reacts in the following reaction formulae when exposed to air, etc. after the preparation.

$$Li_2O + H_2O \rightarrow 2LiOH \qquad \text{Reaction Formula (2)}$$

$$2LiOH + CO_2 \rightarrow Li_2CO_3 + H_2O \qquad \text{Reaction Formula (3)}$$

When such water is present in the cathode active material, the water may be released into a non-aqueous electrolyte solution to react with an electrolyte in the non-aqueous electrolyte solution. This reaction may generate corrosive hydrogen fluoride in a lithium ion secondary battery. Further, an alkali present in the cathode active material may decompose esters in the non-aqueous electrolyte solution. Therefore, preferably the cathode active material may have conditions where a generating amount of water is small in the temperature range from 150° C. to 450° C. when measured by TPD-MS. Namely, a layered compound of which generating amount of water is small when measured by TPD-MS can more improve the charge/discharge cycle properties.

Measurement of TPD-MS may be performed after the cathode active material is dried in vacuo. Whether or not a generating amount of a component released from the cathode active material is a predetermined amount or less may be judged based on the measurement results of the cathode active material thus dried in vacuo after the preparation. Conditions of drying in vacuo may be set to, for example, 150° C. or less and 2 hr or more.

Alternatively, when the target cathode active material was applied to a lithium ion secondary battery and already subjected to charge/discharge operation, the cathode active material is collected by disassembling the lithium ion secondary battery, and measured after washing and drying in vacuo. Then, whether or not a generating amount of a released component is a predetermined amount or less may be judged based on an extrapolation method.

A more preferable aspect of the cathode active material of the present embodiment is represented by the following composition formula:

$$Li_{1+a}Ni_bMn_cCo_dM2_eO_{2+\alpha}$$

(where M2 represents metal elements other than Li, Ni, Mn, and Co; $-0.05 \leq a \leq 0.15$, $0.7 \leq b < 1.0$, $0 \leq c \leq 0.3$, $0 < d < 0.3$, $0 \leq e < 0.1$, $b+c+d+e=1$, $-0.1 \leq \alpha \leq 0.1$) A ternary cathode active material containing at least nickel (Ni), manganese (Mn) and cobalt (Co) as mentioned above efficiently compensates for charges via the metal elements other than nickel (Ni). This charge compensation can suppress crystal structural defects caused in association with reduction of trivalent nickel ($Ni^{3+}$).

A further preferable aspect of the cathode active material of the present embodiment is represented by the following composition formula:

$$Li_{1+a}Ni_bMn_cCo_dM2_eO_{2+\alpha}$$

(where M2 represents metal elements other than Li, Ni, Mn, and Co; $-0.05 \leq a \leq 0.15$, $0.7 \leq b < 1.0$, $0.05 \leq c \leq 0.20$, $0.05 \leq d \leq 0.25$, $0 \leq e < 0.1$, $b+c+d+e=1$, $-0.1 \leq \alpha \leq 0.1$)

A ternary cathode active material as mentioned above efficiently compensates for charges via manganese and cobalt, and simultaneously more stabilizes the crystal structure. This phenomenon tends to more suppress an increase in the internal resistance caused in association with the charge/discharge cycles, thereby to make the increase smaller.

Here, transition metals, non-transition metals or a combination thereof may be included in metal elements (M2) other than Li, Ni, Mn and Co. Examples of the metal elements (M2) include aluminum (Al), titanium (Ti), zirconium (Zr), molybdenum (Mo), tungsten (W), vanadium (V), niobium (Nb), chromium (Cr), iron (Fe), magnesium (Mg), calcium (Ca), copper (Cu), zinc (Zn), and tin (Sn) or the like. Among those elements, in view of stabilizing the layered structure, preferably aluminum (Al) or titanium (Ti) may be included. However, aluminum (Al) or titanium (Ti) may not be necessarily included. Further, the metal elements (M2) other than Li, Ni, Mn and Co may not be substantially included.

The cathode active material of the present embodiment has a specific surface area of preferably 0.1 m²/g or more and 2.0 m²/g or less, more preferably 0.1 m²/g or more and 1.0 m²/g or less. The above described range of the specific surface area of the cathode active material can suppress the internal resistance, make the discharge capacity excellent, and further improve the electrode density. Note, a specific surface area of the cathode active material is measured by the BET method.

<Method for Producing Cathode Active Material Used for Lithium Ion Secondary Battery>

Next, a method for producing a cathode active material used for a lithium ion secondary battery in an embodiment of the present invention will be described in detail.

A method for producing a cathode active material used for a lithium ion secondary battery in the present embodiment relates to a method for producing a layered compound having a high content of nickel and represented by the above composition formula: $Li_{1+a}M1O_{2+\alpha}$. In detail, the method preferably includes a grinding and mixing step, a granulating step, a calcinating step and a firing step in this order. A layered compound having small generating amounts of oxygen gas and water when measured by TPD-MS can be produced by satisfying the following predetermined production conditions in those steps.

As raw materials of the cathode active material, used are a lithium raw material containing lithium as a component and a metal raw material containing metal elements (M1) other than lithium.

In general, when a layered compound having a high content of nickel is prepared, lithium hydroxide having a low melting point of 462° C. is usually used as a lithium raw material. However, use of lithium hydroxide as a main raw material makes a firing reaction proceed in a liquid phase state to facilitate growth of particles. Thus, this phenomenon lowers a firing temperature at which a crystallite size is suitable to a high capacity and low resistance, likely resulting in an insufficient reaction between the lithium raw material and the metal raw material other than lithium. As a result, the amounts of the lithium raw material remaining in the cathode active material, crystal water and hydrated water are increased, thereby causing a disadvantage for increasing a generating amount of water when measured by TPD-MS.

Therefore, lithium carbonate is mainly used as a lithium raw material containing lithium as a component. More specifically, a content of lithium carbonate per lithium raw material is set to 80 mass % or more. The content of lithium carbonate can be adjusted to an appropriate value in the range of 80 mass % or more and 100 mass % or less. Namely, as for a lithium raw material, lithium carbonate may be used alone, or other lithium compound may be used in combination with lithium carbonate.

Lithium carbonate is relatively easily available and has a high melting point of 723° C. This feature allows the firing reaction to easily proceed in a solid phase, thereby to suppress the growth of particles. This phenomenon can increase the firing temperature up to high, thereby making a crystallite size be suitable to a high capacity and low resistance. Further, this also enables sufficient progress of the reaction between the lithium raw material and the metal raw material other than lithium.

Other lithium compounds usable in combination with lithium carbonate include, for example, lithium acetate, lithium citrate, lithium oxalate, lithium hydroxide, and lithium nitrate or the like. Among those compounds, a preferable one is lithium hydroxide, lithium citrate, or lithium oxalate.

As for a metal raw material containing metal elements (M1) other than lithium, used are nickel compounds containing at least nickel as a component. The content of the nickel compound may be set to an appropriate value depending on the composition of the metal elements in the cathode active material targeted to be prepared. Namely, as for the metal raw material, a nickel compound may be used alone, or in combination with other metal compound.

Such a nickel compound includes, for example, nickel hydroxide, nickel oxyhydroxide, nickel carbonate, nickel acetate, nickel citrate, nickel oxalate, and nickel nitrate or the like. Among those compounds, a preferable nickel compound is nickel hydroxide.

Other metal compounds include, for example, a carbonate, a hydroxide, an oxyhydroxide, an acetate, a citrate, an oxalate, and a nitrate of metal or the like. Among those compounds, a preferable metal compound is a carbonate or a hydroxide of metal, most preferably a hydroxide of metal.

In the grinding and mixing step, ground and mixed are a lithium raw material including a lithium compound containing lithium as a component and having a content of lithium carbonate of 80 mass % or more, and a metal raw material including a nickel compound containing nickel as a component, so that an average particle diameter becomes 0.3 μm or less. Grinding and mixing the lithium raw material and the metal raw material produces a powder that becomes a raw material of the cathode active material.

In general, when a layered compound having a high content of nickel is prepared, first a transition metal composite compound is prepared via a coprecipitation method. After that, lithium hydroxide, etc. having a low melting point is mixed as a lithium raw material, and the resulting mixture is fired at a relatively low temperature in the range about 650° C. or more and about 900° C. or less. In the above preparation method, lithium hydroxide having a low melting point can be melted at a temperature significantly lower than the firing temperature.

Accordingly, the cathode active material hardly starts crystallization before lithium hydroxide melts to start lithium diffusing. Namely, the firing process rarely proceeds under the conditions that the lithium composition is in a heterogeneous state. Due to this phenomenon, crystalline homogeneity of the cathode active material is more easily held, allowing a decrease in damages possibly caused when the layered compound having a high content of nickel is produced.

On the contrary, a solid phase reaction is used in the present embodiment for the purpose of decreasing crystal structural defects via intentional use of lithium carbonate having a high melting point. In such a preparation method, lithium carbonate having a high melting point may start melting at almost near the firing temperature. Thus, this phenomenon may induce the cathode active material to start crystallization before lithium carbonate melts and the molten lithium starts diffusing. Namely, crystallization of the entire material proceeds under the conditions that the lithium composite is in a heterogeneous state. This phenomenon may surely increase the crystal structural defects as well as the excessive lithium.

Therefore, in the grinding and mixing step, the compositional homogeneity of the mixed powder is made to be enhanced by grinding and mixing the powdery raw materials to have an average particle diameter of 0.3 µm or less. Herein, an average particle diameter more than 0.3 µm cannot hold the compositional homogeneity in particles of the cathode active material. This may facilitate an increase in the crystal structural defects and an increase in the excessive lithium.

Atomizing lithium carbonate and the metal raw material can make the mixed powder homogeneous even in the region where an average particle diameter of the mixed powder of lithium and metals other than lithium is in a degree of 1 µm or less, without forming a liquid phase via melt of lithium carbonate. Therefore, a cathode active material having high homogeneity of the crystal structure may be obtained. Preferably, an average particle diameter of the mixed powder is set to 0.28 µm or less, more preferably 0.26 µm or less.

Further, in view of handling the mixed powder during the preparation, preferably an average particle diameter of the mixed powder may be set to 0.05 µm or more. An average particle diameter of 0.05 µm or more of the mixed powder can suppress an increase in a slurry velocity. Moreover, the average particle diameter of 0.05 µm or more of the mixed powder can appropriately make the powder ground and diffuse, even when no grinding medium is used.

Means for grinding and mixing the lithium raw material and the metal raw material include, for example, appropriate milling devices such as a boll mill, a beads mill, a jet mill, and a rod mill or the like. A milling method may be any one of a dry-milling process and a wet-milling process. However, in view of minimizing a particle diameter of the powder thus obtained, a wet-milling process is preferable.

In the granulating step, the powder is granulated by a spray-dry method. Firing the cathode active material after subjected to the granulating step allows the cathode active material to have a particle diameter and a specific surface area suitable to predetermined specifications and application thereto. Preferably, a granulating step via a spray-dry process is conducted by setting an average particle diameter of secondary particles of the powder to 1 µm or more.

A spray-dry method may be any one of a 2-fluid nozzle type, a 4-fluid nozzle type, and a disc type or the like. Note, in view of minimizing a particle diameter of the powder thus obtained, it is preferable to use a wet-process. As for a dispersion medium, used are appropriate types of media like alcohols. However, it is preferable to use a non-aqueous dispersion medium. Here, a calcinating step and a firing step may be conducted after subjected to the grinding and mixing step via omitting the granulating step.

In the calcinating step, a powder thus obtained in the grinding and mixing step is calcinated. Calcinating the powder as a pre-treating step before the firing step decreases crystal structural defects of the cathode active material, thereby to decrease the generating amounts of oxygen gas and water when measured by TPD-MS. Appropriate crushing and classifying of the powder thus calcinated can produce a powder to be used as a raw material of the cathode active material.

Preferably, a heat-treating temperature in the calcinating step is set to 400° C. or more and 720° C. or less. Further, preferably a heat-treating time in the calcinating step is set to 2 hr or more and 50 hr or less. Note, the calcinating step is conducted under an oxidizing atmosphere, more preferably an oxygen atmosphere. Further, the firing step may be conducted after subjected to the grinding and mixing step or the granulating step via omitting the calcinating step, depending on the conditions of a chemical composition and a firing step of the cathode active material.

In the firing step, the powder is fired in the temperature range of 650° C. or more and 900° C. or less. Although a temperature of the firing is close to a melting point of lithium carbonate used as a lithium source, a liquid phase reaction in which particles may sharply grow is prevented from occurring because of atomization of the powdery raw materials. Namely, the cathode active material exclusively crystallizes in a solid phase reaction. This can facilitate a change in the nickel valence from bivalence to trivalence, thereby to promote lithium occupation of the lithium site thus occurring associated with the valence change, even though the firing temperature is relatively high. The above event can produce a cathode active material having high homogeneity in the crystal structure.

More specifically, a heat-treating temperature in the firing step may be selected in the range of 650° C. or more and 900° C. or less corresponding to a composition, a particle diameter, and porosity, etc. of the cathode active material. A temperature less than 650° C. makes the reaction between the lithium raw material and the metal raw material insufficiently proceed, resulting in many crystal structural defects of the cathode active material. Further, a temperature more than 900° C. makes the crystal particles coarse, which results in a failure of achieving a high capacity and low resistance. In view of preventing formation of coarse crystal particles and increasing the capacity, a temperature range of, for example, 650° C. or more and 850° C. or less is more preferable.

Preferably, a heat-treating time in the firing step may be set to 2 hr or more when the cathode active material is fired in a resting state, for example, possibly set to 2 hr or more and 50 hr or less. More preferably, the heat-treating time may be set to 2 hr or more and 12 hr or less. A heat-treating time less than 2 hr tends to make the reaction between the lithium raw material and the metal raw material insufficiently proceed. Alternatively, a heat-treating time more than 50 hr tends to increase the energy used in the firing step, likely leading to a high production cost. Note, preferably the firing step is conducted under an oxidizing atmosphere, more preferably under an oxygen atmosphere. Moreover, in view of decreasing the generating amounts of oxygen gas and water when measure by TPD-MS, it is preferable to conduct the firing step under an oxygen flow.

The above described method can produce a layered compound which generates oxygen gas of 30 mass ppm or less in the temperature range from 200° C. to 450° C., and has a high content of nickel. Further, the method can also produce a layered compound which generates oxygen gas of 200 mass ppm or less in the temperature range from 150° C. to 450° C., and has a high content of nickel.

A chemical composition of the cathode active material thus produced can be determined by, for example, inductively coupled plasma-atomic emission spectrometry (ICP-AES) or the like. Further, a crystal structure of the cathode active material can be determined by, for example, X-ray diffraction (XRD) analysis.

<Lithium Ion Secondary Battery>

Next, a lithium ion secondary battery in an embodiment of the present invention will be described in detail.

FIG. 1 is a cross-sectional view showing a lithium ion secondary battery in an embodiment of the present invention.

As shown in FIG. 1, a lithium ion secondary battery 1 of the present embodiment is configured to include a cathode 10, a separator 11, an anode 12, a battery can 13, a cathode current collector tab 14, an anode current collector tab 15, an inner lid 16, an internal pressure release valve 17, a gasket 18, a positive temperature coefficient (PCT) resistance element 19, a battery lid 20, and an axis center 21. The battery lid 20 is an integrated unit including an inner lid 16, an internal pressure release valve 17, a gasket 18, and a resistance element 19.

In FIG. 1, the cathode and the anode 12 are provided in a sheet shape, and stacked each other via inserting the separator 11 therebetween. Then, the stack of the cathode 10, the separator 11 and the anode is wound around the axis center 21, thereby to form a cylindrical electrode group. Note, a structure of the battery group may take various shapes exemplified as an approximately circle wound form, a strip electrodes stacked form, and a multi layered stacked form of envelope separators each housing the electrode (i.e., anode or cathode), instead of the cylindrical form shown in FIG. 1.

The axis center 21 may be formed to have any cross-sectional shape suitable for supporting the cathode 10, the separator 11 and the anode 12. Such a cross-sectional shape may include, for example, a cylindrical one, a columnar one, a rectangular cylindrical one, and a polygonal one. Further, the axis center 21 may be provided by using any material with a good insulation property. Such a material includes, for example, polypropylene and polyphenylene sulfide or the like.

The battery can 13 may take suitable shapes such as a cylindrical shape, a flat long circular shape, a flat elliptical shape, a polygonal shape, and a coin shape depending on the shape of the electrode group. A material of the battery can 13 includes, for example, aluminum, an aluminum alloy, stainless steel, and nickel plated steel or the like. An internal surface of the battery can 13 may be subjected to a surface finishing treatment in order to improve the corrosion resistance and adhesiveness.

The cathode 10 and the anode 12 are respectively connected with a cathode current collection tab 14 and an anode current collection tab 15 used for current extraction via using spot welding or ultrasonic welding or the like. Then, the electrode group provided with the cathode current collection tab 14 and the anode current collection tab 15 is housed in the battery can 13. Herein, the cathode current collection tab 14 is electrically connected to a bottom surface of the battery lid 20 and the anode current collection tab 15 is electrically connected to an internal wall of the battery can 13.

As shown in FIG. 1, a plurality of the cathode current collection tabs 14 and the anode current collection tabs 15 may be arranged in the electrode group. For example, arranging the plurality of the tabs 14 and 15 may manage a large current.

A non-aqueous electrolyte solution is injected inside the battery can 13. A method for injecting the non-aqueous electrolyte solution may have the step of directly injecting the solution in the state where the battery lid 20 is opened, or injecting the solution through an inlet port arranged at the battery lid 20 in the state where the battery lid 20 is closed. An opening of the battery can 13 is sealed by joining the battery lid 20 via welding or calking. Note, the battery lid 20 is provided with an internal pressure release valve 17 so that the valve 17 is opened when an internal pressure of the battery can 13 is excessively increased.

<Cathode>

The cathode 10 is configured to include a layered compound having a high content of nickel (Ni) represented by $Li_{1+a}M1O_{2+\alpha}$ as a cathode active material. For example, the cathode 10 is configured to include a cathode mixture layer formed of a cathode active material, a binder and a conducting agent, and a cathode current collector made by coating one side or both sides of the collector with the cathode mixture layer. The cathode active material is prepared by the above described method in the state where generating amounts of oxygen gas and water are small when measured by TPD-MS.

As for a conducting agent, for example, used are carbon particles such as graphite, carbon black, acetylene black, Katzchen black and channel black; and carbon fibers. As for those conducting agents, a singly type agent may be used alone or a plurality of the agents may be used in combination. Preferably, an amount of the conducting agent is set to 5 mass % or more and 20 mass % or less per cathode active material. The amount of the conducting agent set in this range may achieve an excellent electric conductivity as well as a high capacity.

As for a binder, appropriate materials may be used including, for example, polyvinylidene fluoride (PVDF), polytetrafluoro-ethylene, polychlorotrifluoroethylene, polypropylene, polyethylene, an acrylic polymer, a polymer having imide and amide groups, and copolymers of those materials. Such a binder may be used alone or a plurality of the binders may be used in combination.

Further, a thickening binder such as carboxymethylcellulose may be used in combination. An amount of the binder is preferably set to the range of 1 mass % or more and 7 mass % or less per total amount of the cathode active material, a conductive agent and the binder. The amount of the binder within this range may rarely decrease the capacity and prevent an excessive increase in the internal resistance. Further, the amount within this range may hardly deteriorate coating properties and formability of the cathode mixture layer, and strength of the cathode mixture layer.

As for a cathode current collector, for example, used are a metal foil, a metal plate, an expand metal, and a punching metal or the like, all made of aluminum, stainless steel or titanium, etc. The metal foil may be a perforated foil having a perforation diameter of about 0.1 mm or more and 10 mm or less. Preferably, the metal foil has a thickness of 10 μm or more and 100 μm or less.

The cathode 10 can be produced, for example, by mixing a cathode active material, a conducting agent, a binder and an appropriate solvent to prepare a cathode mixture; coating a cathode current collector with the cathode mixture, and subsequently drying and compression-molding the resulting product. A method for coating the cathode with the cathode mixture includes, for example, a doctor blade method, a dipping method, and a spraying method. As for a method for compression-molding the cathode mixture, used is, for example, a rolling-press method.

A thickness of the cathode mixture layer may be appropriately set in consideration of specifications of the lithium ion secondary battery to be produced, and a balance with the anode. For example, when both surfaces of the cathode current collector are coated, preferably the thickness is set to 50 μm or more and 200 μm or less.

<Separator>

The separator 11 is arranged to prevent a short circuit from occurring via direct contact of the cathode 10 to the anode 12. As for the separator 11, used are a microporous film such as polyethylene, polypropylene and an aramid resin, or a film prepared by coating a surface of the microporous film with a heat-resistance material like alumina particles.

<Anode>

The anode 12 is configured to include an anode active material capable of reversibly intercalating/de-intercalating lithium ions. The anode 12 is configured, for example, provided with an anode active material, a binder, and an anode current collector.

As for an anode active material, used is an appropriate material used in a typical lithium ion secondary battery. Examples of the anode active material include, a material produced by treating an easily graphitizable material obtained from natural graphite, petroleum coke, pitch coke at a high temperature of 2500° C. or more; a material produced by coating surfaces of mesophase carbon, amorphous carbon and graphite with amorphous carbon; and a carbon material of which crystallinity of surface is lowered by mechanically treating a surface of natural graphite or artificial graphite.

Further, the additional examples include a material produced by coating and adsorbing a surface of carbon with an organic material such as a polymer; a lithium metal; a lithium alloy with aluminum, tin, silicon, indium, gallium and magnesium; a material produced by supporting a metal on a surface of silicon particles or carbon particles; and oxides of metal such as tin, silicon, iron, and titanium. Herein, the metals to be supported include, for example, lithium, aluminum, tin, silicon, indium, gallium, magnesium, and alloys thereof.

A for a binder, any one of an aqueous binder that is soluble, swellable or dispersible in water, and an organic binder that is not soluble, swellable or dispersible in water may be used. Examples of the aqueous binder include, for example, a styrene-butadiene copolymer, an acrylic polymer, a polymer having a cyano group, and copolymers thereof. Examples of the organic binder include polyvinylidene fluoride (PVDF), polytetrafluoroethylene, and copolymers thereof. Those binders may be used alone or in combination with a plurality of binders. Further, a thickening binder like carboxymethylcellulose may be used in combination.

An amount of the aqueous binder is preferably set to 0.8 mass % or more and 3.0 mass % or less per total amount of the anode active material and the binder. Further, an amount of the organic binder is preferably set to 3 mass % or more and 6 mass % or less per total amount of the anode active material and the binder. The amount of the binder in this range may rarely decrease a battery capacity and cause an excessive increase in internal resistance. Further, the amount in this range may hardly deteriorate coating properties and formability of the anode mixture layer, and strength thereof.

As for an anode current collector, used are, for example, a metal foil, a metal plate, a foamed metal plate, an expand metal, and a punching metal or the like, all made of materials such as copper or a copper alloy mainly containing copper. The metal foil may be a perforated foil having a perforation diameter of about 0.1 mm or more and 10 mm or less. Preferably, the metal foil has a thickness of 7 µm or more and 25 µm or less.

The anode 12 can be produced, for example, by mixing an anode active material, a binder and an appropriate solvent to prepare an anode mixture; coating an anode current collector with the anode mixture, and subsequently drying and compression-molding the resulting product. A method for coating the anode with the anode mixture includes, for example, a doctor blade method, a dipping method, and a spraying method. As for a method for compression-molding the anode mixture, used is, for example, a rolling-press method, etc.

A thickness of the anode mixture layer may be appropriately set in consideration of specifications of the lithium ion secondary battery to be produced, and a balance with the cathode. For example, when both surfaces of the anode current collector are coated, preferably the thickness is set to 50 µm or more and 200 µm or less.

<Non-Aqueous Solvent>

As for a non-aqueous solvent, used are a chain carbonate, a cyclic carbonate, a chain carboxylic acid ester, a cyclic carboxylic acid ester, a chain ether, a cyclic ether, an organic phosphorous compound and an organic sulfur compound or the like. Those compounds may be used alone or in combination with a plurality of compounds.

Preferably, the chain carbonate includes a compound having a chain alkyl group with 1 or more and 5 or less carbon atoms. Examples of those chain carbonates include dimethyl carbonate, ethyl methyl carbonate, diethyl carbonate, methyl propyl carbonate, and ethyl propyl carbonate or the like. Further, the cyclic carbonate includes ethylene carbonate, propylene carbonate, vinylene carbonate, 1,2-butylene carbonate, and 2,3-butylene carbonate or the like.

The chain carboxylic acid ester includes, for example, methyl acetate, ethyl acetate, propyl acetate, butyl acetate, methyl propionate, ethyl propionate, and propyl propionate or the like. Further, the cyclic carboxylic acid ester includes, for example, γ-butyrolactone, γ-valerolactone, and δ-valerolactone or the like.

The chain ether includes, for example, dimethoxymethane, diethoxymetane, 1,2-dimethoxyethane, 1-ethoxy-2-methoxyethane, and 1,3-dimethoxypropane or the like. Further, the cyclic ether includes, for example, tetrahydrofuran, 2-methyltetrahydrofuran, and 3-methyltetrahydrofuran or the like.

The organic phosphorous compound includes, for example, phosphoric acid esters such as trimethyl phosphate, triethyl phosphate and triphenyl phosphate; phosphorous acid esters such as trimethyl phosphite, triethyl phosphite and triphenyl phosphite; and trimethylphosphine oxide or the like. Further, the organic sulfur compound includes, for example, 1,3-propane sultone, 1,4-butane sultone, methyl methanesulfonate, sulfolane, sulfolene, dimethylsulfone, ethyl methyl sulfone, methyl phenyl sulfone, and ethyl phenyl sulfone or the like.

Each of those compounds used for a non-aqueous solvent may be a compound that has a substituent, or a compound in which an oxygen atom is replaced by a sulfur atom. Such a substituent includes, for example, halogen atoms like a fluorine atom, a chlorine atom and a bromine atom. When two or more types of compounds are used in combination as a non-aqueous solvent, especially it is preferable to combine a compound having a high specific electric conductivity and a relatively high viscosity like a cyclic carbonate and a cyclic lactone with a compound having a relatively low viscosity like a chain carbonate. For example, when a cyclic carbonate and a chain carbonate are used in combination, preferably a rate of the cyclic carbonate is set to 40 volume % or less, more preferably 30 volume % or less.

As for an electrolyte, used are lithium salts including, for example, $LiPF_6$, $LiBF_4$, $LiC_{10}O_4$, $LiAsF_6$, $LiCF_3SO_2$, $Li(CF_3SO_2)_2N$, $Li(C_2F_5SO_2)_2N$, $Li(F_2SO_2)_2N$, $LiF$, $Li_2CO_3$, $LiPF_4 (CF_3)_2$, $LiPF_4 (CF_3SO_2)_2$, $LiBF_3 (CF_3)$, $LiBF_2(CF_3SO_2)_2$, lithium bisoxalate borate, and lithium difluorooxalate borate or the like. As for the electrolyte, one type of those compounds may be used alone, or a plurality of compounds may be used in combination.

The electrolyte solution preferably includes a non-aqueous solvent especially of ethylene carbonate or propylene carbonate together with dimethyl carbonate or ethyl methyl carbonate, and an electrolyte especially of lithium hexafluorophosphate (LiPF$_6$). Herein, a preferable electrolyte solution includes an electrolyte of at least one member selected from the group of LiPF$_6$, LiBF$_4$, LiClO$_4$, LiAsF$_6$, LiCF$_3$SO$_2$, Li(CF$_3$SO$_2$)$_2$N, Li(C$_2$F$_5$SO$_2$)$_2$N and Li(F$_2$SO$_2$)$_2$N. Ethylene carbonate and propylene carbonate have an advantage that each has a high electric conductivity. Ethylene carbonate has an advantage that peeling of a graphite electrode hardly occurs more than propylene carbonate. Moreover, dimethyl carbonate and ethyl methyl carbonate have low viscosities.

On the other hand, lithium hexafluorophosphate is an especially preferable electrolyte due to the excellent solubility and ionic conductivity. Combination use of LiBF$_4$ that is hardly hydrolyzed by lithium hexafluorophosphate may improve a high-temperature preservation property of battery.

A concentration of the electrolyte, for example, of lithium hexafluorophosphate is preferably set to the range of 0.6 mol/L or more and 1.8 mol/L or less per electrolyte solution. This is because the concentration of the electrolyte at 0.6 mol/L or more easily achieves a good ionic conductivity. Further, the concentration of the electrolyte at 1.8 mol/L or less keeps a ratio of the non-electrolyte solvent at a certain degree or more, resulting in a less excessive increase in the ionic conductivity.

The non-aqueous electrolyte solution may include various types of additives, for example, a film forming agent that forms a coating film on a surface of an anode active material; an overcharge inhibitor that prevents an overcharge of battery; a flame retardant that improves fire-resistance (i.e., self-quenching property) of the non-aqueous electrolyte solution; and further a wettability enhancer that improves wettability of electrodes and separators.

The film forming agent includes, for example, carboxylic acid anhydrides like vinylene carbonate, sulfur compounds like 1,3-propansulton, and boron compounds such as lithium bis(oxalato)borate (LiBOB) and trimethyl borate (TMB), each of which is also used as a solvent. Here, it is known that an SEI (solid electrolyte interphase) film is formed on a surface of the anode active material via decomposed compounds of the non-aqueous electrolyte solution. The SEI film has an effect for suppressing decomposition of the non-aqueous electrolyte solution. However, the SEI film may increase the internal resistance when the film is excessively formed, and sometimes consume a lot of electric charges during the film formation. Hence, addition of a film forming agent like vinylene carbonate can reform the SEI film to a stably chargeable/dischargeable film, enabling life-elongation of battery.

The overcharge inhibitor includes, for example, biphenyl, biphenyl ether, terphenyl, methylterphenyl, dimethylterphenyl, cyclohexylbenzene, dicyclohexylbenzene, triphenylbenzene, and hexaphenylbenzene or the like. Further, as for the frame retardant, usable are, for example, organic phosphorous compounds such as trimethyl phosphate and triethyl phosphate; and fluorides of the above described non-aqueous solvents like boric acid esters. Moreover, as for the wettability enhancer, usable are, for example, chain ethers like 1,2-dimethoxyethan or the like.

Accordingly, the lithium ion secondary battery as described above has a cathode provided with a layered compound that has a high content of nickel and generates small amounts of oxygen gas and water in the temperature range from 200° C. to 450° C. when measured by TPD-MS. This construction can simultaneously achieve a high capacity as well as excellent cycle properties. Further, a small increase in the internal resistance caused in association with the charge/discharge cycles can stably maintain the capacity and output of battery during the charge/discharge operation.

EXAMPLES

Hereinafter, the present invention will be more specifically described referring to Examples. However, the technological scope of the present invention is not limited to those Examples.

As an Example of a cathode active material used for a lithium ion secondary battery of the present invention, prepared was a layered compound having a high content of Ni and a layered structure assigned to the space group of R-3m. Then, evaluated were relationships of generating amounts of oxygen gas (O$_2$) and water (H$_2$O) measured by TPD-MS against an increasing ratio of internal resistance caused in association with charge/discharge cycles.

Example 1

In Example 1, a cathode active material having a composition of "Li:Ni:Co:Mn=1.04:0.80:0.15:0.05" was prepared by spray-granulating an extremely fine powder of raw material, and firing the resulting granules at the temperature of 770° C. Then, the resulting product was evaluated.

More specifically, the cathode active substrate of Example 1 was prepared by the following procedure. First, lithium carbonate, nickel hydroxide, cobalt hydroxide, and manganese carbonate were respectively weighed so that a mole rate of each component element was adjusted to the above described mole rate, and mixed. Then, the mixture was added with pure water, and ground and mixed. The grinding and mixing step was carried out by using a planetary ball mill so that an average particle diameter of the powdery raw material was adjusted to 0.25 μm.

Next, a slurry of the powdery raw material thus obtained in the grinding and mixing step was spray-granulated by a spray-dry method using a 2 fluid nozzle. Then, a powder of secondary particles thus obtained was filled in an alumina firing vessel, and calcinating the powder under an oxygen atmosphere at 600° C. for 12 hr. Next, the resulting powder thus calcinated was fired under the oxygen atmosphere at 770° C. for 10 hr to produce a cathode active material.

Analysis of a scanning electron microscope showed that primary particles of the cathode active material thus obtained had an average particle diameter of about 0.35 μm. Further, secondary particles thus obtained by a spray-granulating method had an average particle diameter of about 10 μm.

Example 2

In Example 2, a cathode active material having a composition of "Li:Ni:Co:Mn:Ti=1.03:0.79:0.15:0.05:0.01" was prepared by spray-granulating an extremely fine powder of raw material, and firing the resulting granules at the temperature of 770° C. Then, the resulting product was evaluated.

A cathode active material of Example 2 was prepared the same as in Example 1 except that lithium carbonate, nickel hydroxide, cobalt hydroxide, manganese carbonate and an ammonium salt of titanium lactate were weighed so that the mole rate was adjusted to "Li:Ni:Co:Mn:Ti=1.03:0.79:0.15:0.05:0.01", and ground and mixed.

Analysis of a scanning electron microscope showed that primary particles of the cathode active material thus obtained had an average particle diameter of about 0.35 μm. Further, secondary particles thus obtained by the spray-granulating method had an average particle diameter of about 10 μm.

Example 3

In Example 3, a cathode active material having a composition of "Li:Ni:Co:Mn=1.04:0.80:0.15:0.05" was prepared by spray-granulating an extremely fine powder of raw material, and firing the resulting granules at the temperature of 740° C. Then, the resulting product was evaluated.

A cathode active material of Example 3 was prepared the same as in Example 1 except that a powder thus obtained in the calcinating step was fired under an oxygen atmosphere at 740° C. for 10 hr.

Analysis of a scanning electron microscope showed that primary particles of the cathode active material thus obtained had an average particle diameter of about 0.25 μm. Further, secondary particles thus obtained by the spray-granulating method had an average particle diameter of about 10 μm.

Example 4

In Example 4, a cathode active material having a composition of "Li:Ni:Co:Mn=1.02:0.80:0.15:0.05" was prepared by spray-granulating an extremely fine powder of raw material, and firing the resulting granules at the temperature of 740° C. Then, the resulting product was evaluated.

A cathode active material of Example 4 was prepared the same as in Example 1 except that lithium carbonate, nickel hydroxide, cobalt hydroxide, and manganese carbonate was weighed so that the mole rate was adjusted to "Li:Ni:Co:Mn:=1.02:0.80:0.15:0.05", and ground and mixed. A product thus obtained in the calcinating step was fired under the oxygen atmosphere at 740° C. for 10 hr.

Analysis of a scanning electron microscope showed that primary particles of the cathode active material thus obtained had an average particle diameter of about 0.25 μm. Further, secondary particles thus obtained by the spray-granulating method had an average particle diameter of about 10 μm.

Example 5

In Example 5, a cathode active material having a composition of "Li:Ni:Co:Mn=1.04:0.70:0.10:0.20" was prepared by spray-granulating an extremely fine powder of raw material, and firing the resulting granules at the temperature of 830° C. Then, the resulting product was evaluated.

A cathode active material of Example 5 was prepared the same as in Example 1 except that lithium carbonate, nickel hydroxide, cobalt hydroxide, and manganese carbonate was weighed so that the mole rate was adjusted to "Li:Ni:Co:Mn:=1.04:0.70:0.10:0.20", and ground and mixed. A product thus obtained in the calcinating step was fired under the oxygen atmosphere at 830° C. for 10 hr.

Analysis of a scanning electron microscope showed that primary particles of the cathode active material thus obtained had an average particle diameter of about 0.25 μm. Further, secondary particles thus obtained by the spray-granulating method had an average particle diameter of about 10 μm.

Comparative Example 1

In Comparative Example 1, a cathode active material having a composition of "Li:Ni:Co:Mn=1.02:0.80:0.15: 0.05" was prepared by spray-granulating an extremely fine powder of raw material, and firing the resulting granules at the temperature of 740° C. Then, after the resulting product was exposed to the air, a cathode active material was evaluated.

A cathode active material in Comparative Example 1 was prepared the same as in Example 4 except that after firing, the resulting product was spread on a tray to have a thickness of 4 mm or less, and exposed to the air at 25° C. and the humidity of 70% for 5 hr.

Analysis of a scanning electron microscope showed that primary particles of the cathode active material thus obtained had an average particle diameter of about 0.25 μm. Further, secondary particles thus obtained by the spray-granulating method had an average particle diameter of about 10 μm.

Comparative Example 2

In Comparative Example 2, a cathode active material having a composition of "Li:Ni:Co:Mn=1.04:0.80:0.15: 0.05" was prepared by coprecipitating the raw materials, and firing the resulting precipitate at the temperature of 710° C. Then, the resulting product was evaluated.

More specifically, a cathode active material of Comparative Example 2 was prepared by the following procedure. First, nickel sulfate, cobalt sulfate, and manganese sulfate were weighed so that the mole rate of the respective component element was adjusted to "Ni:Co:Mn:=0.8:0.15:0.05, and mixed. Then, the resulting mixture was added with pure water to be dissolved.

Next, the aqueous solution thus obtained was dropped in a sodium hydroxide solution, and precipitates thus formed were filtered and dried to produce a transition metal composite hydroxide. Then, a powder of the transition metal composite hydroxide thus obtained was heat-treated to produce an oxide. Then, lithium hydroxide was weighed so that a mole rate of the respective composition elements was adjusted to "Li:Ni:Co:Mn=1.04:0.80:0.15:0.05 and mixed to the oxide. After that, a powder thus obtained was calcinated under an oxygen atmosphere at 600° C. for 12 hr. Next, the resulting powder thus obtained in the calcinating step was fired under an oxygen atmosphere at 710° C. for 10 hr to produce a cathode active material.

Analysis of a scanning electron microscope showed that primary particles of the cathode active material thus obtained had an average particle diameter of about 0.30 μm. Further, secondary particles thus obtained by the spray-granulating method had an average particle diameter of about 6 μm.

Comparative Example 3

In Comparative Example 3, a cathode active material having a composition of "Li:Ni:Co:Mn=1.04:0.80:0.15: 0.05" was prepared by spray-granulating an extremely fine powder of raw materials, and firing the resulting granules at the temperature of 820° C. Then, the resulting product was evaluated.

A cathode active material in Comparative Example 3 was prepared the same as in Example 1 except that a powder thus obtained in the calcinating step was fired under an oxygen atmosphere at 820° C. for 1 hr.

Analysis of a scanning electron microscope showed that primary particles of the cathode active material thus obtained had an average particle diameter of about 0.35 μm.

Further, secondary particles thus obtained by the spray-granulating method had an average particle diameter of about 10 μm.

Comparative Example 4

In Comparative Example 4, a cathode active material having a composition of "Li:Ni:Co:Mn=1.07:0.50:0.20:0.30" was prepared by spray-granulating an extremely fine powder of raw materials, and firing the resulting granules at the temperature of 950° C. Then, the resulting product was evaluated.

A cathode active material of Comparative Example 4 was prepared the same as in Example 1 except that lithium carbonate, nickel hydroxide, cobalt hydroxide, and manganese carbonate was weighed so that the mole rate was adjusted to "Li:Ni:Co:Mn:=1.07:0.50:0.20:0.30", and ground and mixed. A powder thus obtained in the calcinating step was fired under the oxygen atmosphere at 950° C. for 10 hr.

Analysis of a scanning electron microscope showed that primary particles of the cathode active material thus obtained had an average particle diameter of about 0.45 μm. Further, secondary particles thus obtained by the spray-granulating method had an average particle diameter of about 10 μm.

Comparative Example 5

In Comparative Example 5, a cathode active material having a composition of "Li:Ni:Co:Mn=1.04:0.80:0.15:0.05" was prepared by spray-granulating a coarse powder of raw material, and firing the resulting granules at the temperature of 770° C. Then, the resulting product was evaluated.

A cathode active material of Comparative Example 5 was prepared the same as in Example 1 except that the grinding and mixing step was performed so that an average particle diameter of the powdery raw material was adjusted to 0.70 μm, and the resulting coarse powder was spray-granulated.

Table 1 shows the synthetic conditions of the respective cathode active materials thus prepared.

Figure 2:
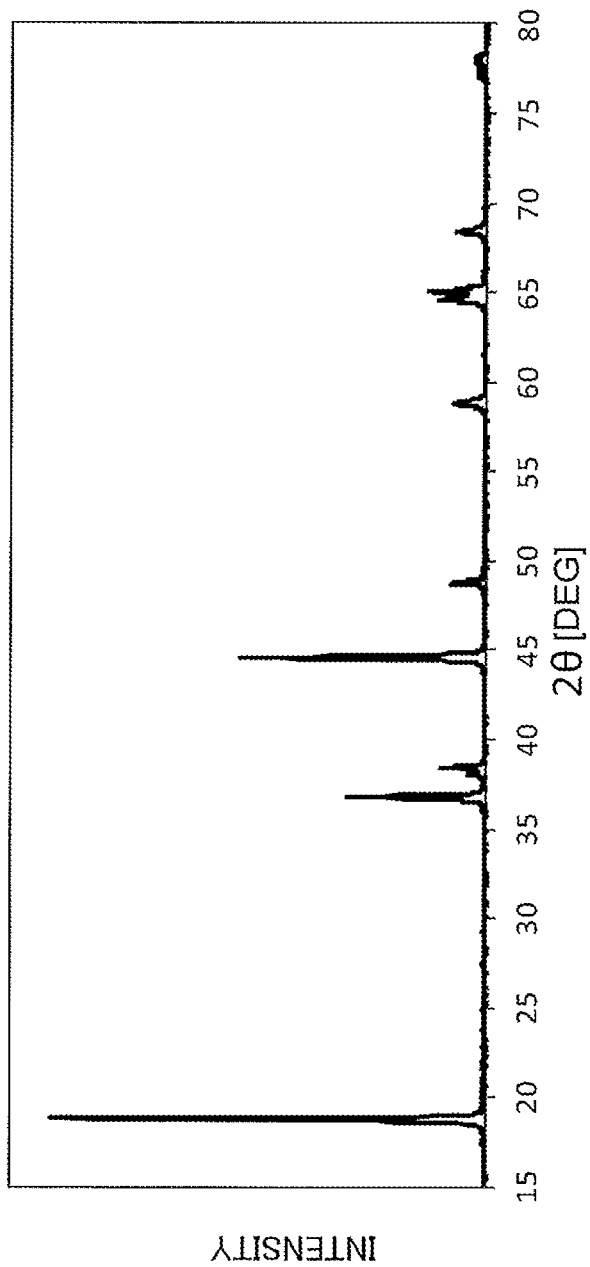
FIG. 2 is a diagram showing an example of an X-ray diffraction pattern of a cathode active material in Example of the present invention.

FIG. 2 is a diagram showing an example of X-ray diffraction pattern of the cathode active material in Example 1 of the present invention.

The cathode active material in Example 1 was measured by a powder X-ray diffraction apparatus (Rigaku Co., Ltd. Ultima III). As a result, an X-ray diffraction pattern assigned to the space group of R3-m, was obtained as shown in FIG. 2. Further, similar X-ray diffraction patterns were obtained in the cathode active materials of Examples 2-6, and the cathode active materials of Comparative Examples 1-5.

Next, a chemical composition of each cathode active material thus prepared was determined by the inductivity coupled plasma-atom emission spectrometry (ICP-AES). Table 2 shows the results. Note, composition rates shown in Table 2 are standardized via setting the metal elements (M1) other than L1 is 1.

TABLE 2

| | Component Composition Rate | | | | |
|---|---|---|---|---|---|
| | Li | Ni | Co | Mn | Ti |
| Example 1 | 1.01 | 0.80 | 0.15 | 0.05 | — |
| Example 2 | 1.00 | 0.79 | 0.15 | 0.05 | 0.01 |
| Example 3 | 1.01 | 0.80 | 0.15 | 0.05 | — |
| Example 4 | 0.99 | 0.80 | 0.15 | 0.05 | — |
| Example 5 | 1.01 | 0.70 | 0.10 | 0.20 | — |
| Comparative Example 1 | 0.99 | 0.80 | 0.15 | 0.05 | — |
| Comparative Example 2 | 1.02 | 0.80 | 0.15 | 0.05 | — |
| Comparative Example 3 | 1.01 | 0.80 | 0.15 | 0.05 | — |
| Comparative Example 4 | 1.04 | 0.50 | 0.20 | 0.30 | — |
| Comparative Example 5 | 1.01 | 0.80 | 0.15 | 0.05 | — |

Next, generating rates of oxygen and water released from each cathode active material thus prepared were measured by the TPD-MS. The TPD-MS was performed by using a catalyst reaction device (BEL JAPAN INC., BEL CAT) connected to a quadruple mass spectrometer (BEL JAPAN INC., BEL-Mass).

TABLE 1

| | Component Composition Rate | | | | | Firing Temperature (° C.) | Firing Time (hour) | Air Exposed Time (hour) | Particle Diameter of Powdery Raw Material (μm) |
|---|---|---|---|---|---|---|---|---|---|
| | Li | Ni | Co | Mn | Ti | | | | |
| Example 1 | 1.04 | 0.80 | 0.15 | 0.05 | — | 770 | 10 | — | 0.25 |
| Example 2 | 1.03 | 0.79 | 0.15 | 0.05 | 0.01 | 770 | 10 | — | 0.25 |
| Example 3 | 1.04 | 0.80 | 0.15 | 0.05 | — | 740 | 10 | — | 0.25 |
| Example 4 | 1.02 | 0.80 | 0.15 | 0.05 | — | 740 | 10 | — | 0.25 |
| Example 5 | 1.04 | 0.70 | 0.10 | 0.20 | — | 830 | 10 | — | 0.25 |
| Comparative Example 1 | 1.02 | 0.80 | 0.15 | 0.05 | — | 740 | 10 | 5 | 0.25 |
| Comparative Example 2 | 1.04 | 0.80 | 0.15 | 0.05 | — | 710 | 10 | — | — |
| Comparative Example 3 | 1.04 | 0.80 | 0.15 | 0.05 | — | 820 | 1 | — | 0.25 |
| Comparative Example 4 | 1.07 | 0.50 | 0.20 | 0.30 | — | 950 | 10 | — | 0.25 |
| Comparative Example 5 | 1.04 | 0.80 | 0.15 | 0.05 | — | 770 | 10 | — | 0.70 |

Next, a crystal structure of each cathode active material thus prepared was determined by X-ray diffraction measurement.

Here, the TPD-MS was carried out by using a sample of each cathode active material dried in vacuo at 120° C. for 2 hr, and 0.5 g each dispensed after vacuum dry was analyzed.

In the TPD-MS, helium was used as a carrier gas, and a temperature rising rate was set to 10° C./min.

Figure 3:
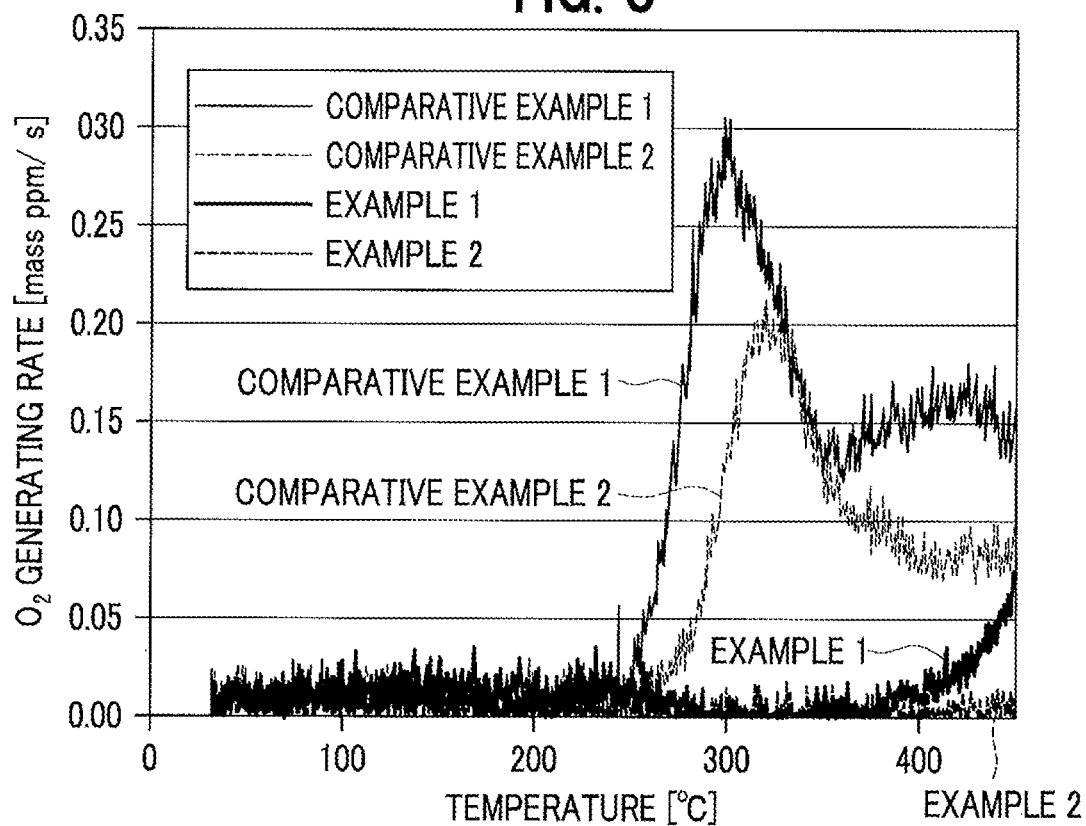
FIG. 3 is a diagram showing an example of results measured by TPD-MS in an oxygen generating rate of the cathode active material.
Figure 4:
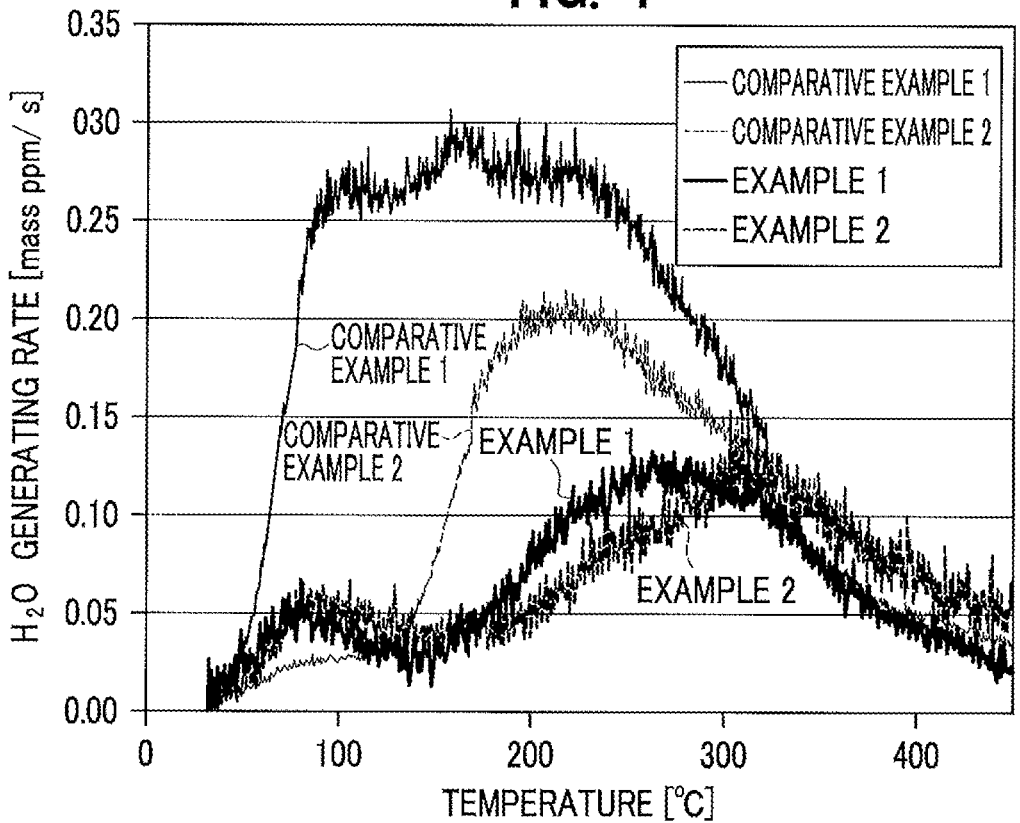
FIG. 4 is a diagram showing an example of results measured by TPD-MS in a water generating rate of the cathode active material.

FIG. 3 is a diagram showing an example of the results obtained by measuring an oxygen gas generating rate of the cathode active material by the TPD-MS. Further, FIG. 4 is a diagram showing an example of the results obtained by measuring a water generating rate of the cathode active material by the TPD-MS. Herein, FIG. 3 shows the results obtained by assuming a fragment of the mass-to-charge rate (m/z) of 32 thus detected by the mass spectrometer to oxygen. Simultaneously, FIG. 4 shows the results obtained by assuming a fragment of the mass-to-charge rate (m/z) of 18 to water.

As shown in FIG. 3, Comparative Examples 1 and 2 indicate that when the temperature is raised over about 250° C., the oxygen generating rates greatly increase, which demonstrates that the oxygen generating amounts are large. On the contrary, Examples 1 and 2 indicate that the oxygen generating amounts are suppressed at a low level. Example 1 indicates that when the temperature is raised over about 400° C., the oxygen generating rate increases due to the heat decomposition. However, Example 2 in which Ti is added indicates that the oxygen generating rate does not increase as it is.

Further, as shown in FIG. 4, Comparative Example 1 indicates that the water generating rate greatly increases at the temperature less than 100° C., which demonstrates that a much amount of adsorption water was included. On the contrary, Comparative Example 2 indicates that the water generating rate does not greatly increase at the temperature less than 100° C., while the rate greatly increases at the temperature over about 150° C. This phenomenon demonstrates that crystal water, etc was included.

In contrast, Examples 1 and 2 indicate that the water generating amount is suppressed at a low level.

As mentioned above, concentrations of generating oxygen and water thus released from each cathode active material thus prepared were calculated by measuring the generating rates of oxygen and water by the TPD-MS respectively. Then, the calculated generating rates were time-integrated, respectively to calculate the concentrations of generating oxygen and water. Table 3 shows the results.

Next, a lithium ion secondary battery was produced by using each cathode active material thus prepared, thereby to measure a discharge capacity, an increasing rate of internal resistance caused in association with charge/discharge cycles.

Here, a cathode used for a lithium ion secondary battery was prepared by the following procedure. First, each cathode active material, a carbon conductive agent, a binder dissolved in N-methyl-2-pyrrolydon (NMP) were mixed at the rate of 90:6:4, thereby to produce a slurry of cathode mixture. Then, the resulting slurry of cathode mixture was coated on a cathode current collector made of aluminum foil with a thickness of 20 μm so that the coated amount was adjusted to 7.0 mg/cm². After that, the product was dried at 120° C., compression-molded by press so that the electrode density was adjusted to 2.7 g/cm³. Then, the resultant product was perforated in a square shape of 2.5 cm×4 cm, so as to produce a cathode used for the lithium ion secondary battery.

Next, an anode of the lithium ion secondary battery was produced by the following procedure. First, graphite that works as an anode active material, sodium methylcellulose, and a styrene-butadiene copolymer were mixed at the rate of 98:1:1 in water, thereby to produce a slurry of anode mixture. Then, the resultant slurry of anode mixture was coated on an anode current collector made of aluminum foil with a thickness of 20 μm so that the coated amount was set to 4.3 mg/cm². After that, the coated product was dried at 120° C., compression-molded by press so that the electrode density was set to 1.5 g/cm³. Then, the resultant product was perforated in a square shape of 2.6 cm×4.1 cm, so as to produce an anode of the lithium ion secondary battery.

A lithium ion secondary battery was produced by the following procedure. The prepared cathode and anode were stacked via inserting a porous separator made of polypropylene having a thickness of 30 μm therebetween. The stack thus obtained was housed in a laminate film bag to produce a lithium ion secondary battery. A non-aqueous electrolyte solution was prepared by mixing ethylene carbonate (EC) and dimethyl carbonate (DMC) at a volume rate of 3:7, adding vinylene carbonate (VC) into the resulting mixed solvent to be set at 1.5 mass %, and dissolving an electrolyte of $LiPF_6$ to be set at 1 mol/L. After the non-aqueous electrolyte solution was injected in the laminate film bag, the laminate film bag was sealed to produce a lithium ion secondary battery.

Next, an initial discharge capacity of the produced lithium ion secondary battery was measured by the following procedure. First, the lithium ion secondary battery was charged at a constant current of 40 A/kg to the upper limit voltage of 4.2 V based on the mass of the cathode active material. Then, the battery was discharged at a constant current of 40 A/kg to the lower limit voltage of 2.7 V based on the mass of the cathode active material. Note, the charge/discharge test was carried out at 25° C. Table 3 shows initial discharge capacities thus measured.

Further, an increasing rate of internal resistance of the produced lithium ion secondary battery was measured by the following procedure. First, the battery was charged at a constant current of 200 A/kg to a 50% voltage of the initial charge capacity based on the mass of the cathode active material. Next, the battery was relaxed for 2 hr. After that, the battery was discharged at a constant current of 200 A/kg for 10 sec based on the mass of the cathode active material, whereby the initial DC resistance was measured. Note, the above described charge/discharge test was carried out at 25° C.

After that, at the temperature of 50° C., the battery was charged at a constant current of 200 A/kg up to a 95% voltage of the initial discharge capacity, and subsequently the battery was discharged at a constant current of 200 A/kg down to a 20% of the initial discharge capacity based on the mass of the cathode active material. This charge/discharge cycle was carried out for a total of 300 cycles. Then, the battery was discharged at a constant current of 200 A/kg based on the mass of the cathode active material for 10 sec, whereby DC resistance after the cycles was measured. Table 3 shows an increasing rate (%) of the DC resistance after completion of the cycles against the initial DC resistance thus measured.

TABLE 3

| | O2 Generatring Amount at 200-450° C. (mass ppm) | H2O Generatring Amount at 150-450° C. (mass ppm) | Diacharge Capacity (Ah/kg) | Resistance Increasing Rate after 300 Cycles (%) |
|---|---|---|---|---|
| Example 1 | 12 | 130 | 194 | 99 |
| Example 2 | 2.0 | 130 | 192 | 62 |
| Example 3 | 20 | 78 | 195 | 121 |
| Example 4 | 23 | 136 | 197 | 159 |

TABLE 3-continued

|  | O2 Generatring Amount at 200-450° C. (mass ppm) | H2O Generatring Amount at 150-450° C. (mass ppm) | Diacharge Capacity (Ah/kg) | Resistance Increasing Rate after 300 Cycles (%) |
|---|---|---|---|---|
| Example 5 | 8.3 | 103 | 183 | 59 |
| Comparative Example 1 | 197 | 289 | 194 | 284 |
| Comparative Example 2 | 121 | 229 | 197 | 251 |
| Comparative Example 3 | 137 | 206 | 160 | 352 |
| Comparative Example 4 | 3.4 | 50 | 160 | 36 |
| Comparative Examnle 5 | 92 | 167 | 181 | 240 |

As shown in Tables 1 to 3, lithium ion secondary batteries having high discharge capacities around 190 Ah/kg were produced with respect to the cathode active materials of Examples 1 to 5. Herein, each of the cathode active materials was prepared by mixing and grinding a raw material till an average particle diameter of the powdery raw material became extremely fine to 0.25 μm, and firing the mixed and ground powder at the temperature of 650° C. or more and 900° C. or less. Those cathode active materials have lower $O_2$ generating amounts of 30 mass ppm or less in the temperature range from 200° C. to 450° C. The cathode active material of Example 5 has a discharge capacity staying at 183 Ah/kg due to a relatively small content of Ni, while the $O_2$ generating amount was suppressed at a low level.

Further, according to the results indicated in Tables 1 to 3, it is determined that the $O_2$ generating amounts of the cathode active materials of Examples 1 to 5 have strong relationships to the increasing rates of resistance. A layered compound having a high content of Ni is known to form a nickel oxide (NiO)-like cubic crystal from a surface of the cathode active material to a depth of several nm to several tens nm. This phenomenon is known to cause a decrease in the capacity and an increase in the resistance.

The above mentioned strong relationships between the $O_2$ generating amount and the increasing rate of resistance are caused because crystal structural defects correspond to crystallization starting points of those cubic crystals.

In the above cathode active materials of Examples 1 to 5, the $O_2$ generating amounts are small and the crystal structural defects are suppressed. This phenomenon may realize lithium ion secondary batteries each suppressing an increase in the internal resistance caused following the charge/discharge cycles, despite of the high content of Ni and high discharge capacity thereof.

Further, as for the cathode active materials of Examples 1 to 5, the $H_2O$ generating amounts in the temperature range from 150° C. to 450° C. are also small as shown in 200 mass ppm or less. Therefore, in the cathode active materials of Examples 1 to 5, the crystal structural defects as well as the water generation amounts are decreased. This phenomenon may suppress the deterioration caused by the reaction between water and the electrolyte solution, thereby to further suppress the increase in the internal resistance caused following the charge/discharge cycles.

On the contrary, as for the cathode active material of Comparative Example 1, the generating amount of $H_2O$ is high because the material is exposed to the air for a long time and lithium hydroxide is used as a raw material. Additionally, the generating amount of $O_2$ is greatly enhanced, suggesting an increase in the crystal structural defects. As a result, although the content of Ni is high and the discharge capacity is high, the increase in the internal resistance caused following the charge/discharge cycles is remarkably observed.

Further, as for the cathode active material of Comparative Example 2, the generating amount of $H_2O$ is high because the material is prepared by a coprecipitation method and lithium hydroxide is used as a raw material. Moreover, the generating amount of 02 is greatly enhanced, suggesting an increase in the crystal structural defects. As a result, although the content of Ni is high and the discharge capacity is high, the increase in the internal resistance caused following the charge/discharge cycles is remarkably observed. The method for firing a product obtained in the coprecipitation method has to lower the firing temperature in order to suppress the excessive growth of particles. This event may suggest the increase in the crystal structural defects.

Moreover, as for the cathode active material of Comparative Example 3, the generating amounts of both $O_2$ and $H_2O$ are high due to the shorter firing time despite of the relatively high firing temperature. The shorter firing time may suggest that the crystal structural defects are easily caused, and make it difficult to remove the adsorbed water contaminated during the production step.

Furthermore, as for the cathode active material of Comparative Example 4, the increase in the internal resistance caused in association with the charge/discharge cycles is small due to a low content of nickel, while the discharge capacity is suppressed to be low.

Further, as for the cathode active material of Comparative Example 5, the generating amounts of both $O_2$ and $H_2O$ are high due to a too large particle diameter of the powdery raw material. Such a too large particle diameter of the powdery raw material may prevent a reaction between lithium and a metal other than lithium from homogeneously proceeding, which suggests an easy occurrence of the crystal structural defects.

Therefore, in order to produce a layered compound having a high discharge capacity, preferably lithium carbonate may be used as a main raw material, a powdery raw material is ground and mixed to be extremely fine, and the resulting product is fired in the range of 650° C. or more and 900° C. or less in a solid phase reaction, in view of reducing the generating amounts of oxygen gas and water when measured by the TPD-MS.

Eventually, decreasing the generating amounts of oxygen gas and water when measured by the TPD-MS can realize a lithium ion secondary battery having a small increase in the internal resistance caused following the charge/discharge cycles as well as the excellent cycle properties.

DESCRIPTION OF REFERENCE NUMERALS

1 Lithium Ion Secondary Battery
10 Cathode
11 Separator
12 Anode
13 Battery Can
14 Cathode Current Collector Tab
15 Anode Current Collector Tab
16 Inner Lid
17 Internal Pressure Releasing Valve
18 Gasket
19 Positive Temperature Coefficient Resistance Element
20 Battery Lid
21 Axis Center

The invention claimed is:

1. A cathode active material used for a lithium ion secondary battery having a layered structure assigned to a space group of R-3m, wherein
the cathode active material is represented by the following composition formula:

$Li_{1+\alpha}Ni_bMn_cCo_dM2_eO_{2+\alpha}$ (where M2 represents metal elements other than Li, Ni, Mn, and Co; $-0.05 \leq a \leq 0.15$, $0.7 \leq b \leq 1.0$, $0<c<0.3$, $0<d<0.3$, $0 \leq e<0.1$, $b+c+d+e=1$, $-0.1 \leq \alpha \leq 0.1$);
a generating amount of oxygen gas in the temperature range from 200° C. to 450° C. is 30 mass ppm or less and a generating amount of water in the temperature range from 150° C. to 450° C. is 200 mass ppm or less, when measured by temperature programmed desorption-mass spectrometry (TPD-MS).

2. The cathode active material used for a lithium ion secondary battery according to claim 1, wherein
M2 in the formula represents Al or Ti.

3. A method for producing the cathode active material used for a lithium ion secondary battery according to claim 1, the method comprising the steps of:
grinding and mixing a lithium raw material including a lithium compound containing lithium as a component and including lithium carbonate, and a metal raw material including a nickel compound containing nickel as a component, so that an average particle diameter of the resultant raw materials is set to 0.3 μm or less;
calcinating a powder thus obtained in the grinding and mixing step in the range of 400° C. or more and 720° C. or less for 2 hours or more and 50 hours or less; and
firing a powder thus obtained in the calcinating step in the range of 650° C. or more and 900° C. or less for 2 hours or more and 50 hours or less.

4. The method for producing the cathode active material used for a lithium ion secondary battery according to claim 3, wherein after the powder is granulated by a spray-dry method, the granulated powder is calcinated or fired.

5. A lithium ion secondary battery comprising a cathode configured to include the cathode active material used for a lithium ion secondary battery according to claim 1.

6. The method for producing the cathode active material used for a lithium ion secondary battery according to claim 3, wherein M2 in the formula represents Al or Ti.

7. The method for producing the cathode active material used for a lithium ion secondary battery according to claim 6, wherein after the powder is granulated by a spray-dry method, the granulated powder is calcinated or fired.

8. A lithium ion secondary battery comprising a cathode configured to include the cathode active material used for a lithium ion secondary battery according to claim 2.

* * * * *